(12) United States Patent
Matthews et al.

(10) Patent No.: US 10,612,459 B2
(45) Date of Patent: Apr. 7, 2020

(54) METHODS AND SYSTEM FOR OPERATING AN ELECTRIC TURBOCHARGER

(71) Applicant: Ford Global Technologies, LLC, Dearborn, MI (US)

(72) Inventors: Patrick Matthews, West Bloomfield, MI (US); Tyler Kelly, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 311 days.

(21) Appl. No.: 15/874,639

(22) Filed: Jan. 18, 2018

(65) Prior Publication Data

US 2019/0218964 A1    Jul. 18, 2019

(51) Int. Cl.
| | |
|---|---|
| *F02B 39/10* | (2006.01) |
| *F02B 37/10* | (2006.01) |
| *F02D 41/00* | (2006.01) |
| *F01N 5/04* | (2006.01) |
| *F02B 37/18* | (2006.01) |
| *F02D 11/10* | (2006.01) |
| *F02D 41/06* | (2006.01) |

(52) U.S. Cl.
CPC .............. *F02B 39/10* (2013.01); *F01N 5/04* (2013.01); *F02B 37/10* (2013.01); *F02B 37/183* (2013.01); *F02D 11/105* (2013.01); *F02D 41/0007* (2013.01); *F02D 41/062* (2013.01)

(58) Field of Classification Search
CPC ........ F02B 37/10; F02B 37/183; F02B 39/10; F02D 41/0007; F02D 41/062; F01N 5/04
USPC ............................................. 60/602
See application file for complete search history.

(56) References Cited

U.S. PATENT DOCUMENTS

| | | | |
|---|---|---|---|
| 2014/0346865 A1* | 11/2014 | Akashi | ............. B60L 1/00 307/10.7 |
| 2016/0101748 A1 | 4/2016 | Ambrosio et al. | |
| 2017/0225635 A1 | 8/2017 | Obayashi et al. | |
| 2019/0112971 A1* | 4/2019 | Fink | ............. H02K 7/14 |

\* cited by examiner

*Primary Examiner* — Patrick D Maines
*Assistant Examiner* — Dapinder Singh
(74) *Attorney, Agent, or Firm* — Geoffrey Brumbaugh; McCoy Russell LLP (57) ABSTRACT

Systems and methods for operating an internal combustion engine that includes an electric turbocharger are described. The systems and methods may operate the electric turbocharger in a motor mode or a generator mode. The electric turbocharger may be operated in a generator mode to reduce an amount of time to activate electric turbocharger in a motor mode.

20 Claims, 4 Drawing Sheets

METHODS AND SYSTEM FOR OPERATING AN ELECTRIC TURBOCHARGER

FIELD

The present description relates to methods and a system for operating an electric turbocharger that is coupled to an internal combustion engine. The methods and systems may be useful to reduce activation times for the electric turbocharger.

BACKGROUND AND SUMMARY

A vehicle may include an internal combustion engine to propel the vehicle and the engine may include a turbocharger to increase output of the engine. The turbocharger may be driven via exhaust gases to pressurize air entering the engine, thereby increasing the engine's capacity to produce power. The turbocharger may also include an electric machine to increase air flow to the engine during times when engine exhaust flow is low. The electric machine may be supplied power from an inverter. The inverter converts direct current (DC) power to alternating current (AC) power so that the electric machine may generate torque to rotate the turbocharger's compressor. The inverter may include power filtering capacitors that have to be charged to a threshold level before the electric machine may be operated as a motor. The power filtering capacitors may be supplied with power from a vehicle system power supply via a power contactor. The vehicle system power supply may not be available to supply power to the power filtering capacitors for a period of time due to diagnostics, system checking functions, and other reasons at a time of an engine start request. Therefore, the power contactor may be held in an open state for a period of time before the power filtering capacitors may be charged. As a result, it may not be possible for the electric machine to supply torque to rotate the turbocharger compressor for a predetermined amount of time after the engine is started and running. Consequently, if the vehicle is started and a driver requests power just after the engine is started, engine performance may be less than is expected.

The inventors herein have recognized the above-mentioned issues and have developed an engine operating method, comprising: receiving input to a controller indicative of a request to start an engine; and operating an electric turbocharger in a generator mode and charging a power filter capacitor coupled to a DC bus via the controller in response to the received input.

By operating the electric turbocharger in a generator mode and charging a power filter capacitor that is coupled to a DC bus in response to input to a controller that is indicative of an engine start request, it may be possible to provide the technical result of charging the power filter capacitor before the electrical power contactor is closed so that the electric turbocharger may be operated in a motor mode earlier as compared to if the power filter capacitor is charged solely via a vehicle system power supply.

The present description may provide several advantages. In particular, the approach may reduce an amount of time between when a power contactor is closed and when an electric turbocharger may be operated in a motor mode. Further, the approach may decrease an electrical load on a vehicle system power supply. In addition, the approach may provide precise charging control for power filter capacitors.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
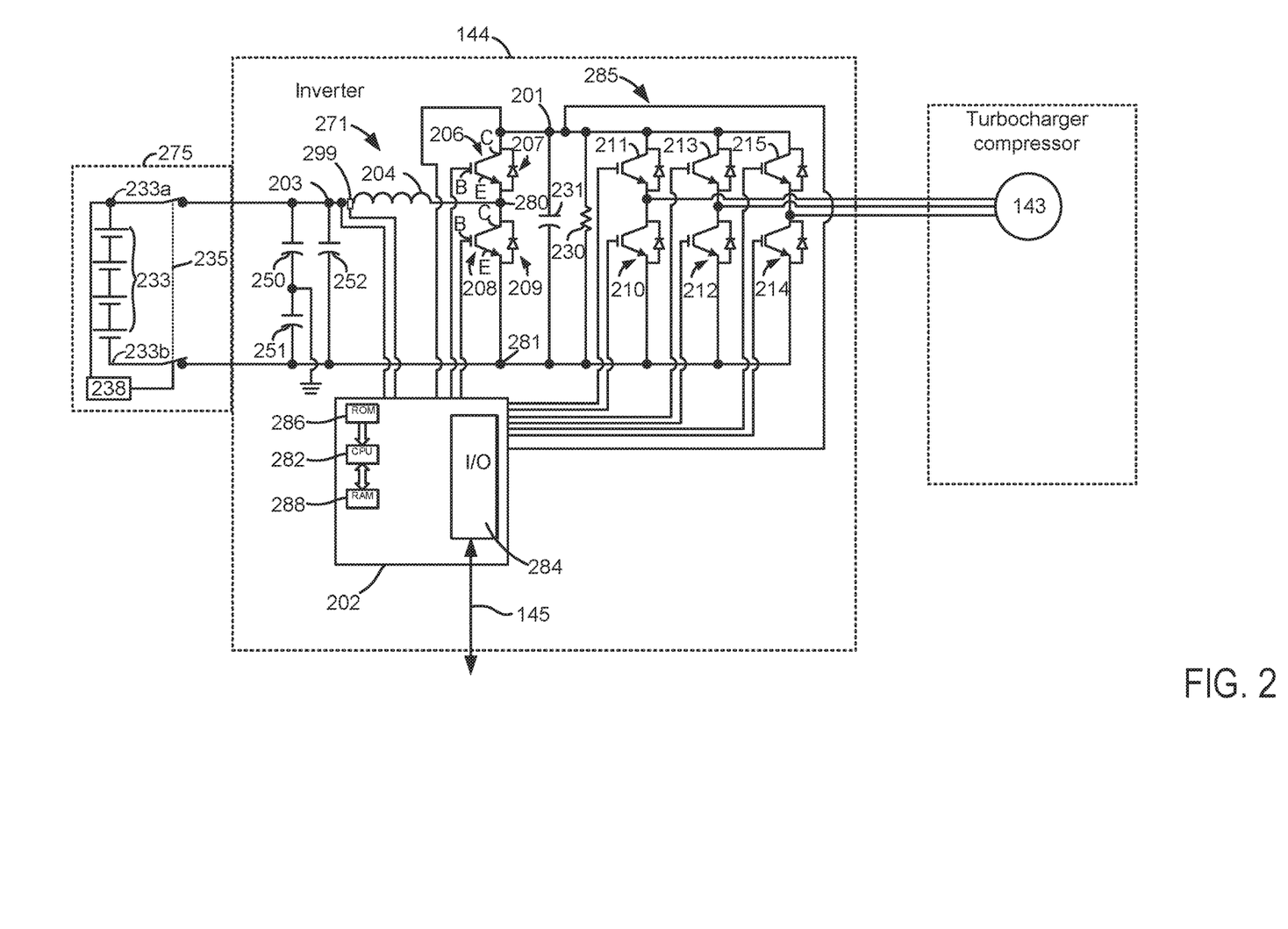
FIG. 2 is a schematic diagram of an inverter and an electrically driven turbocharger.
Figure 3:
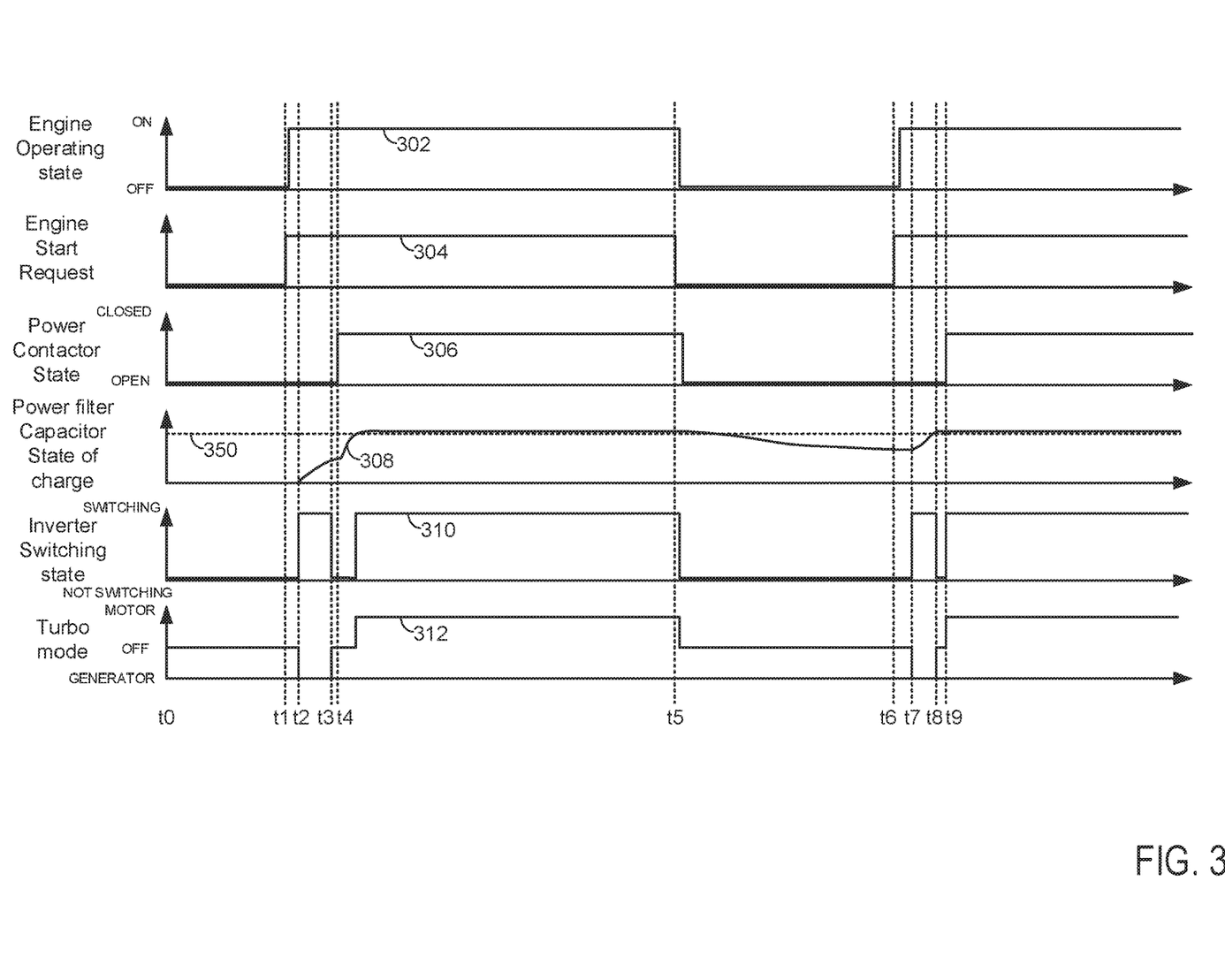
FIG. 3 is an example engine operating sequence according to the method of FIG. 4.

The present description is related to operating an engine that includes an electric turbocharger. The engine may be of the type shown in FIG. 1 and it may include an electric turbocharger. The electric turbocharger may operate in a motor mode and in a generator mode. The electric turbocharger may compress air that enters the engine while it operates in the motor mode. The electric turbocharger may convert energy from the vehicle's exhaust system into electrical power while it operates in a generator mode. The electric turbocharger may be electrically coupled to an inverter as is shown in FIG. 2. The electric turbocharger and engine may operate as shown in the sequence of FIG. 3 according to the method of FIG. 4.

Figure 1:
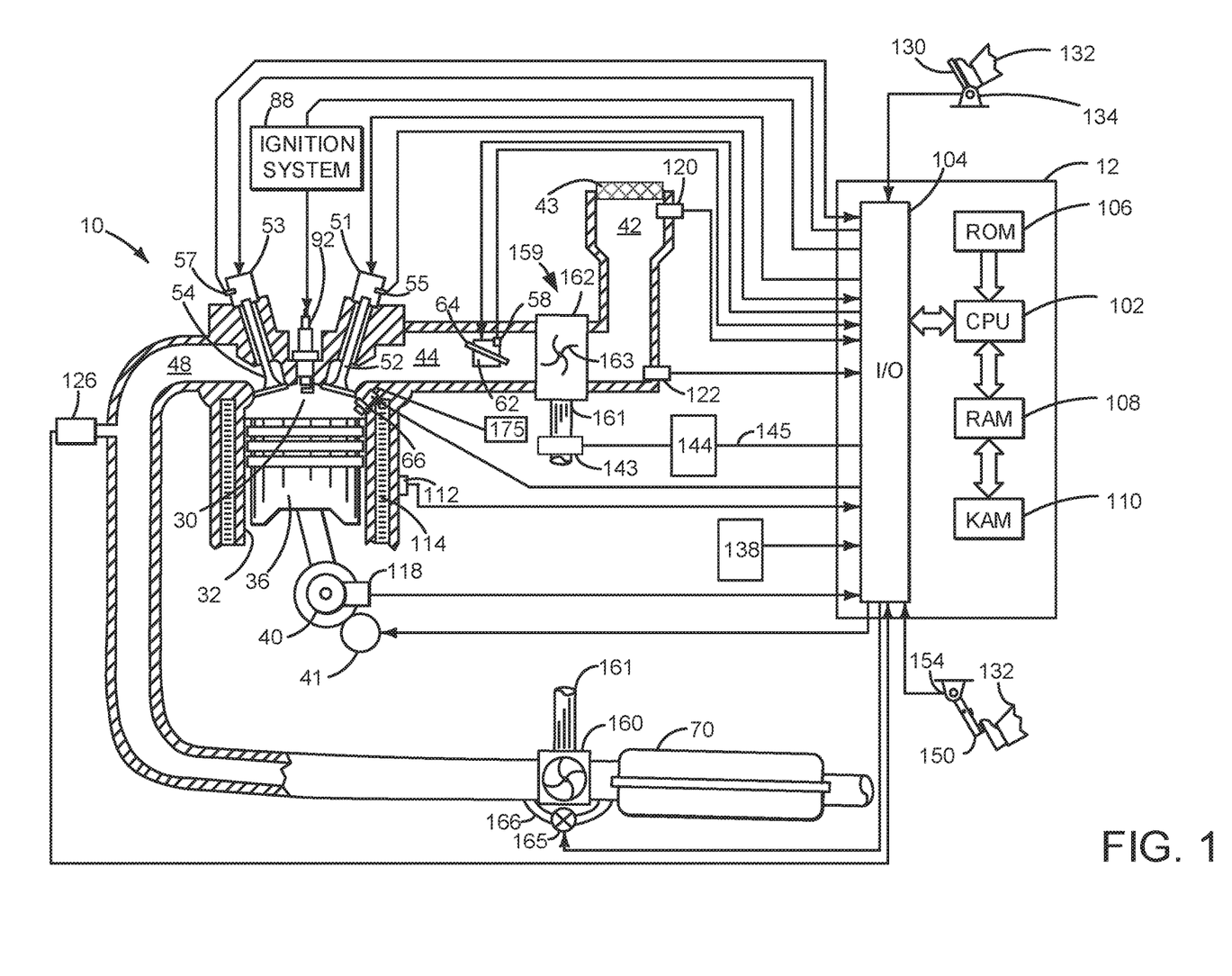
FIG. 1 is a schematic diagram of an internal combustion engine.

Referring to FIG. 1, internal combustion engine 10 comprises a plurality of cylinders, one cylinder of which is shown in FIG. 1. Engine 10 is controlled by electronic engine controller 12. The controller receives signals (e.g., input) from the various sensors of FIG. 1 and it employs the various actuators of FIG. 1 to adjust engine operation based on the received signals and instructions stored in memory of controller 12. For example, fuel injection timing, spark timing, and poppet valve operation may be adjusted responsive to engine position as determined from output of an engine position sensor.

Engine 10 includes combustion chamber 30 and cylinder walls 32 with piston 36 positioned therein and connected to crankshaft 40. Starter motor 41 may rotate crankshaft 40 during engine starting. Combustion chamber 30 is shown communicating with intake manifold 44 and exhaust manifold 48 via respective intake poppet valve 52 and exhaust poppet valve 54. Each intake and exhaust valve may be operated by a variable intake valve operator 51 and a variable exhaust valve operator 53, which may be actuated mechanically, electrically, hydraulically, or by a combination of the same. Intake valve operator 51 and an exhaust valve operator may open intake 52 and exhaust 54 valves synchronously or asynchronously with crankshaft 40. The position of intake valve 52 may be determined by intake valve position sensor 55. The position of exhaust valve 54 may be determined by exhaust valve position sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In addition, intake manifold 44 is shown communicating with optional electronic throttle 62 (e.g., a butterfly valve), which adjusts a position of throttle plate 64 to control air flow from air filter 43 and air intake 42 to intake manifold 44. Throttle 62 regulates air flow from air filter 43 in engine air intake 42 and electric turbocharger 159 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Electric turbocharger 159 includes a compressor 162 that may be rotated via turbine 160 and shaft 161. Thus, turbine 160 is mechanically coupled to compressor 162 via shaft 161. Electric machine 143 is also coupled to shaft 161 and it may also rotate compressor 162 when it is supplied with electrical power via inverter 144. Controller 12 may communicate with inverter 144 via controller area network (CAN) 145 or via an alternative communication path. Vanes 163 of compressor 162 may rotate to compress air entering engine 10. Speed of compressor 162 may be regulated via electric machine 143 and/or wastegate 165. Wastegate 165 may be opened via controller 12 to allow exhaust gases to bypass turbine 160 via bypass passage 166. Electric turbocharger 140 may pump air from air intake 42 to throttle 62 via increasing a speed of vanes 163. Controller 12 may increase and decrease a speed of vanes 163 to increase and decrease air pressure upstream and downstream of throttle 62. Controller 12 may increase compressor speed via increasing electric current supplied to electric machine 143 and/or via closing wastegate 165. Controller 12 may decrease compressor speed via decreasing electric current supplied to electric machine 143 and/or via opening wastegate 165.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 may include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined. Controller 12 may also receive input from human/machine interface 138, which may be configured as a pushbutton, key switch, or interactive display panel.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring to FIG. 2, inverter 144 is shown electrically coupled to electric machine 143. Inverter may also be selectively electrically coupled to vehicle system power supply 275 via power contactor 235. Vehicle system power supply 275 may include one or more batteries and a power supply controller. In this example, vehicle system power supply 275 includes a plurality of battery cells 233 that are connected in series to increase a voltage of vehicle system power supply 275. Inverter 144 is also shown being electrically coupled to electric machine 140 (e.g., a three phase electric machine that may be operated as a motor or alternator).

Inverter 144 includes a controller 202 that may communicate with controller 12 shown in FIG. 1 via controller area network (CAN) 145. Controller 202 is electrically coupled to bases of transistors 206, 208, and 210-215. Controller 202 may supply control signals to independently activate and deactivate transistors 206, 208, and 210-215. Controller 202 includes inputs and outputs 284 (e.g., digital inputs, digital outputs, analog inputs, analog outputs), non-transitory memory 286 (e.g., read only or electrically erasable memory), central processing unit 282, and transitory memory 288. Controller 202 may sense voltage at node 203 and current flow through inductor 204 via current sensor 299. Further, controller 202 may sense a voltage of power filter capacitor 231 at node 201.

Transistors 206, 208, and 210-215 are shown as insulated gate bipolar transistors (IGBT), but in alternative configurations, they may be metal oxide field effect transistors (MOSFETs), field effect transistors (FETs), or other known types of transistors. Controller 202 may activate IGBTs via supplying a higher potential voltage to gates of transistors 206, 208, and 210-215. Controller 102 may deactivate IGBTs via supplying a lower potential voltage to gates of transistors 206, 208, and 210-215. Gates of transistors 206 and 208 are indicted by the letters "G." Collectors of transistors 206 and 208 are indicated by letters "C." Emitters of transistors 206 and 208 are indicated by letters "E." Transistors 210-215 have similar bases, emitters, and collectors as indicated for transistors 206 and 208. Transistors 206 and 208 also include diodes 207 and 209, which are forward biased between the respective emitters and collectors. Current may flow between the collectors and the emitters of transistors 206 and 208 when they are activated. Current flow between the collectors and emitters of transistors 206 and 208 is prevented when transistors 206 and 208 are deactivated. Transistors 210-215 operate similarly, but these transistors form a three-phase transistor array. Transistors 210-215 may be selectively activated and deactivated to convert DC to AC and AC to DC.

Inductor 204 is shown directly electrically coupled to transistors 206 and 208. Inductor 204 is also directly electrically coupled to capacitor 250, capacitor 252. Inductor 204 may be selectively electrically coupled to vehicle system power supply 275. Vehicle system power supply includes a controller 238, which may perform diagnostics, system checks, perform balancing operations, communicate with controller 12 of FIG. 1, and operate power contactor 235. Capacitor 251 is shown electrically coupled to capacitor 250 and a negative side of vehicle system power supply 275.

In a boost mode, controller 202 may selectively activate transistor 208, which may be referred to as a boost transistor, to charge inductor 204 via charge provided by vehicle system power supply 275 from positive terminal 233*a*. Inductor 204 impedes current flow as it begins to store electric energy in a magnetic field. The polarity of the left hand side of inductor 204 is positive when boost transistor 208 is closed. Current flow through inductor 204 is reduced and its magnetic field begins to collapse when boost transistor 208 is opened. The polarity of inductor 204 changes so that the right side of inductor 204 has the positive polarity as its collapsing magnetic field supports continuing current flow to the load. The voltage of vehicle system power supply 275 and the voltage developed across inductor 204 are connected in series, thereby providing the voltage of vehicle system power supply 175 plus the voltage of inductor 204 at node 280. The voltage at node 280 less a small voltage drop across diode 207 develops at node 201, which is the output of the variable voltage control inverter boost circuit and input to transistors 210-215 when variable voltage converter (VVC) 271 is operating in a boost mode and electric machine 143 is operating as a motor, since diode 207 is forward biased. Charge may be stored in power filter capacitor 231 to smooth the output voltage of the boost circuit at node 201. Power filter capacitor 231 may have a high storage capacity that may require seconds to tens of seconds to charge. The voltage at node 201 is a DC voltage along the length of DC bus 285. The variable voltage control inverter boost circuit may include capacitors 250-252, inductor 204, boost transistor 208, diode 209, and diode 207. The voltage at node 201 is supplied to transistors 210-215 which switch on and off to provide three phase AC power to electric machine 140. Buck transistor 206 is commanded deactivated whenever boost transistor 208 is commanded activated so as to prevent short circuiting between node 201 and node 281. In some examples, VCC 271 may be omitted and the vehicle system power supply 275 may be directly coupled to the three-phase inverter transistors.

If only a small amount of power is requested of electric machine 143, vehicle system power supply voltage minus small voltage drops for inductor 204 and diode 207 may be supplied at node 201 by deactivating buck transistor 206 and boost transistor 208.

In a buck mode, charge may be supplied to inductor 204 via electric machine 143. In particular, three phase AC output of electric machine 143 may be converted into a DC voltage at node 201 via switching of transistors 210-215 via controller 202. The DC voltage at node 201 may charge power filter capacitor 231. Inductor 204 may be charged via activating transistor 206, which may be referred to as a buck transistor. However, if electric machine 143 is charging power filter capacitor 231 in response to an engine start, transistors 206 and 208 may remain off so that only power filter capacitor 231 is charged and capacitors 250, 251, and 252 are not charged. If transistor 206 is activated, inductor 204 impedes current flow as it begins to store electric energy in a magnetic field. The polarity of the right hand side of inductor 204 is positive when boost transistor 206 is closed. Current flow through inductor 204 is reduced and its magnetic field begins to collapse when buck transistor 206 is opened. The polarity of inductor 204 changes so that the left side of inductor 204 has the positive polarity as its collapsing magnetic field supports continuing current flow to the load (e.g., capacitors 250, 251, and 252). The amount of time inductor 204 is allowed to charge is controlled so that voltage that develops across inductor 204 is less than voltage output via the electric machine 143. Diode 209 couples the right side of inductor 204 to node 281, which is coupled to negative battery terminal 233*b*. The voltage developed across inductor 204 is connected to positive terminal 233*a* of vehicle system power supply 275. Charge from inductor 204 may flow to capacitors 250, 251, and 252. The voltage at node 203 is controlled via adjusting the amount of time buck transistor 206 is activated (e.g., closed to allow current flow through the transistor). Boost transistor 208 is deactivated (e.g., opened to inhibit current flow through the transistor) whenever buck transistor 206 is activated. Charge may be stored in capacitors 250-252 to smooth the output voltage of the buck circuit at node 203. The voltage at node 203 is a DC voltage. The variable voltage control inverter buck circuit may include capacitors 250-252, inductor 204, buck transistor 206, diode 209, capacitor 231, and resistor 230. Voltage and node 203 is the output voltage of the variable voltage control inverter buck circuit. Controller 202 may monitor voltages at nodes 203 and 201. Further, controller 202 may adjust the duty cycle of signals supplied to boost transistor 208 and buck transistor 206 responsive to voltages at nodes 203 and 201.

Thus, the system of FIGS. 1 and 2 provides for a system, comprising: an engine; an electric turbocharger coupled to the engine; an inverter electrically coupled to the electric turbocharger, the inverter including a power filter capacitor coupled to a DC bus; a power contactor selectively coupling a DC power source to the inverter; and a controller including executable instructions stored in non-transitory memory to start the engine and operate the electric turbocharger in a generator mode to charge the power filter capacitor before the power contactor is closed. The system includes where the inverter includes a three-phase transistor array. The system includes where the inverter includes a buck transistor and a boost transistor. The system further comprises additional instructions to adjust a position of a wastegate to control output of the electric turbocharger when the electric turbocharger is operating in the generator mode. The system further comprises additional instructions to adjust a position of a wastegate to control output of the electric turbocharger when the electric turbocharger is operating in a motor mode. The system further comprises additional instructions to cease operating the electric turbocharger in the generator mode in response to a voltage of the power filter capacitor.

Referring now to FIG. 3, an engine operating sequence according to the method of FIG. 5 is shown. The sequence of FIG. 3 may be performed via the system of FIGS. 1 and 2. The vertical lines at t0-t9 represent times of interest during the sequence.

The first plot from the top of FIG. 3 is a plot of engine operating state versus time. The vertical axis represents engine operating state. The engine is off, not rotating, and not combusting fuel when trace 302 is at a lower level near the horizontal axis. The engine is on, rotating, and combusting fuel when trace 302 is at a higher level near the vertical axis arrow. The horizontal axis represents time and the amount of time increases from the left side of the plot to the right side of the plot.

The second plot from the top of FIG. 3 is a plot of an engine start request state versus time. The vertical axis represents an engine start request state. The engine start request state is not asserted when trace 304 is at a lower level near the horizontal axis. The engine start request state is asserted when trace 304 is at a higher level near the vertical axis arrow. The engine start request remains asserted while the engine is on. The horizontal axis represents time and the amount of time increases from the left side of the plot to the right side of the plot.

The third plot from the top of FIG. 3 is a plot of a power contactor state (e.g., state of contactor 235 shown in FIG. 2) versus time. The vertical axis represents power contactor state. The power contactor state is open (e.g., electrical power is not conducted through the contactor) when trace 306 is at a lower level near the horizontal axis. The contactor state is closed (e.g., electrical power is conducted through the contactor) when trace 306 is at a higher level near the vertical axis arrow. The horizontal axis represents time and the amount of time increases from the left side of the plot to the right side of the plot.

The fourth plot from the top of FIG. 3 is a plot of power filter capacitor (e.g., capacitor 231 of FIG. 2) state of charge versus time. The vertical axis represents power filter capacitor state of charge and power filter capacitor state of charge increases in the direction of the vertical axis arrow. Horizontal line 350 represents a threshold power filter capacitor state of charge. The electric turbocharger may not operate in a motor mode until the power filter capacitor state of charge is greater than the level of line 350. The horizontal axis represents time and the amount of time increases from the left side of the plot to the right side of the plot.

The fifth plot from the top of FIG. 3 is a plot of inverter switching state versus time. The vertical axis represents inverter switching state. The inverter switches are not switching when trace 310 is at a lower level near the horizontal axis. The inverter switches are switching when trace 310 is at a higher level near the vertical axis arrow. The horizontal axis represents time and the amount of time increases from the left side of the plot to the right side of the plot.

The sixth plot from the top of FIG. 3 is a plot of turbocharger operating mode versus time. The vertical axis represents turbocharger operating mode. The turbocharger is operating as a motor when trace 312 is at a higher level labeled "motor" along the vertical axis. The turbocharger is operating as a generator when trace 312 is at a lower level labeled "Generator" along the vertical axis. The turbocharger is not operating (e.g., not consuming or producing electrical charge) when trace 312 is at a middle level labeled "OFF" along the vertical axis. The horizontal axis represents time and the amount of time increases from the left side of the plot to the right side of the plot.

At time t0, the engine is off and an engine start request is not asserted. The power contactor is open and the inverter switches (e.g., the three phase switching array switches 210-215) are not switching. The power filter state of charge is low and the turbocharger is off. Such conditions may be indicative of the vehicle not operating or the vehicle operating in an electric only mode where the vehicle is propelled solely via an electric machine (not shown).

At time t1, the engine start request is asserted. The engine start request may be asserted via a human driver requesting an engine start or via a controller requesting an engine start. The engine is off, but it is started shortly after time t1. The power contactor remains open and the power filter capacitor state of charge remains low. The inverter is not switching and the turbocharger is off.

At time t2, the engine is running and the engine start request remains asserted. The turbocharger begins to operate as a generator supplying power to the inverter via exhaust gases from the engine rotating the turbocharger. The inverter three phase switches begin switching and the power filter capacitor state of charge begins to increase as power from the turbocharger is stored in the power filter capacitor. The power contactor remains open as the vehicle system power supply is undergoing system checks and it is not available to supply power to the turbocharger.

Between time t2 and time t3, the engine continues to operate and the engine start request remains asserted. The power contactor remains open and the power filter capacitor state of charge continues to increase. The inverter three phase switches continue to switch and the turbocharger continues to operate as a generator.

At time t3, the vehicle system power supply indicates that the power contactor is about to close (not shown), so the inverter switching is stopped and the turbocharger state changes to off. The engine continues to run and the engine start request remains asserted. The power contactor remains closed and the power filter capacitor state of charge stops increasing.

At time t4, the power contactor is closed to allow power to flow from the vehicle system power supply to the inverter. The engine continues to run and the engine start request remains asserted. The power capacitor state of charge begins to increase again and the inverter does not switch because the power filter capacitor state of charge is less than threshold 350. The turbocharger remains in an off state.

Between time t4 and time t5, the power filter capacitor state of charge exceeds threshold level 350 so the inverter begins switching and the turbocharger begins to operate in a motor mode so that it may supply compressed air to the engine. The engine continues to run and the engine start request remains asserted. The power filter capacitor state of charge remains above threshold 350.

At time t5, the engine start request is not asserted so the engine is stopped shortly thereafter. The power contactor is opened since the engine is not running and because there is no need to pressurize air in the engine air intake when the engine is not running. The inverter also stops switching and the turbocharger enters an off mode.

Between time t5 and time t6, the power filter capacitor state of charge is reduced slowly, which may be due to parasitic losses in the inverter system. The power filter capacitor state of charge level falls below threshold 350. The engine remains off and the engine start request is not asserted. The power contactor remains open and the inverter does not switch. The turbocharger also remains off.

At time t6, the engine start request is asserted. The engine is off, but it is started shortly after time t6. The power contactor remains open and the power filter capacitor state of charge remains below threshold 350 but at a higher state of charge level than it was at time t1. The inverter three phase switches are not switching and the turbocharger is off.

At time t7, the engine is running and the engine start request remains asserted. The turbocharger begins to operate as a generator supplying power to the inverter via exhaust gases from the engine rotating the turbocharger. The inverter three phase switches begin switching and the power filter capacitor state of charge begins to increase from a middle level as power from the turbocharger is stored in the power filter capacitor. The power contactor remains open as the vehicle system power supply is undergoing system checks and it is not available to supply power to the turbocharger.

Between time t7 and time t8, the engine continues to operate and the engine start request remains asserted. The power contactor remains open and the power filter capacitor state of charge continues to increase. The power filter capacitor state of charge approaches threshold 350. The inverter three phase switches continue to switch and the turbocharger continues to operate as a generator.

At time t8, the power filter capacitor state of charge exceeds threshold 350 so the turbocharger is shut off and the inverter three phase switches are stopped from switching. The engine continues to run and the engine start request remains asserted. Shortly thereafter, the vehicle system power supply indicates that the power contactor is about to close (not shown), but since the inverter switching has already stopped switching and because the turbocharger state changes to off, no further action is taken.

At time t9, the power contactor is closed to allow power to flow from the vehicle system power supply to the inverter. The engine continues to run and the engine start request remains asserted. The power capacitor state of charge remains at a high and the inverter three phase switches begin switching so that the turbocharger may supply compressed air to the engine. The turbocharger begins operating in a motor mode. After time t9, the engine continues to operate and the turbocharger supplies compressed air to the engine.

In this way, it may be possible to reduce an amount of time for a power filter capacitor to charge after a power relay is closed so that an electric turbocharger may be made available sooner after an engine start. The activated electric turbocharger may improve engine performance.

Figure 4:
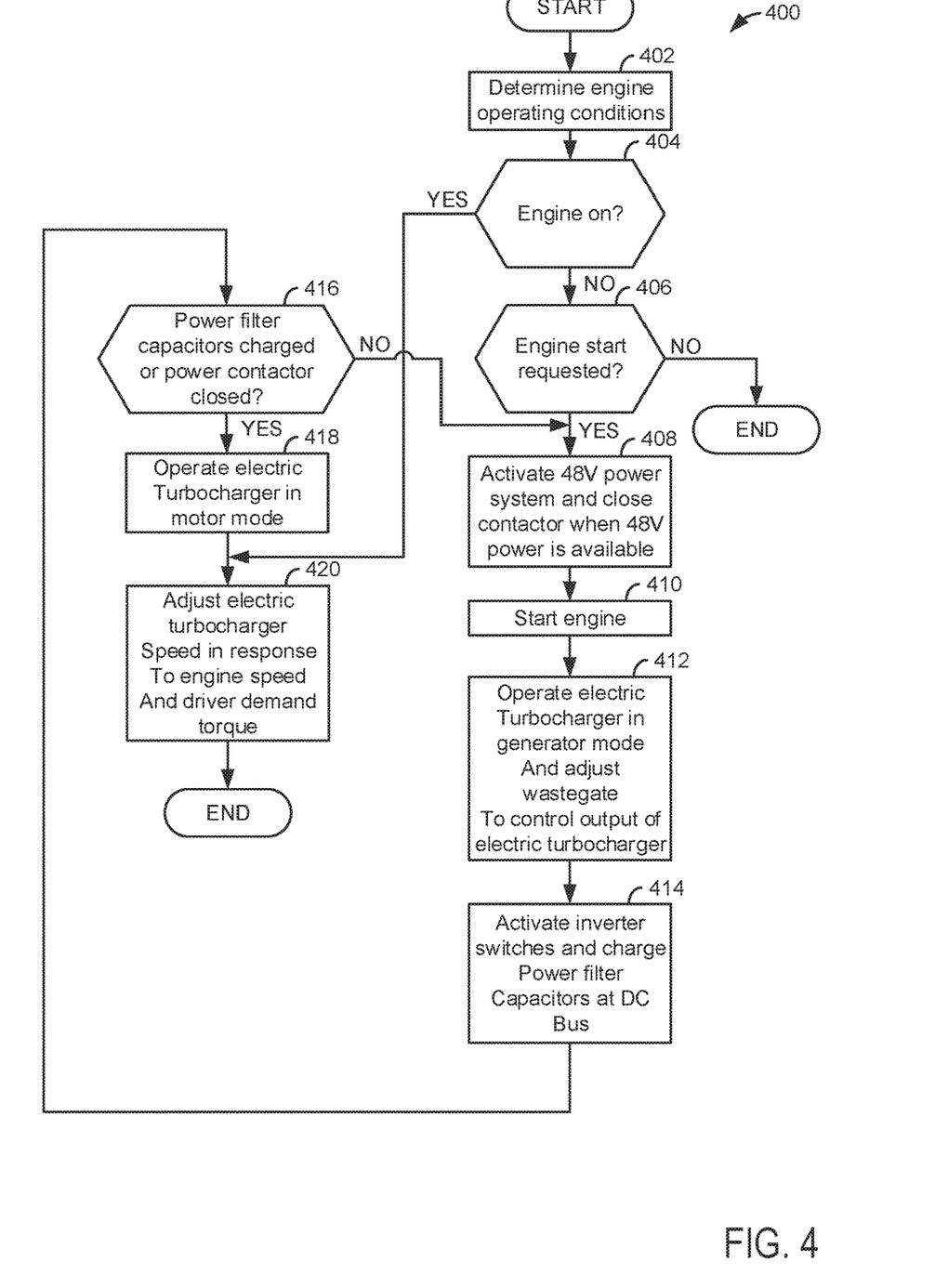
FIG. 4 shows a flow chart of a method for operating an engine and electrically driven turbocharger.

Referring now to FIG. 4, a method for operating an engine is shown. The method of FIG. 4 may be included as executable instructions stored in non-transitory memory of the system of FIGS. 1 and 2. In addition, the methods of FIG. 4 may work in cooperation with the system of FIGS. 1 and 2 to receive data and adjust actuators to control the system of FIGS. 1 and 2 in the physical or real world.

At 402, method 400 determines engine operating conditions. Engine operating conditions may include but are not limited to engine speed, engine load, turbocharger mode, engine temperature, engine start request state, inverter power filter capacitor state of charge, and power contactor state of charge. Method 500 may determine the engine operating conditions from the various sensors described in FIG. 1. Method 400 proceeds to 404.

At 404, method 400 judges if the engine is on (e.g., rotating and combusting fuel). In one example, method 400 may judge that the engine is on or running if engine speed is non-zero and spark and fuel are supplied to the engine. If method 400 judges that the engine is on, the answer is yes and method 400 proceeds to 420. Otherwise, the answer is no and method proceeds to 406.

At 420, method 400 adjusts a speed of the electric turbocharger responsive to engine speed and driver demand torque. The driver demand torque may be determined from accelerator pedal position and engine speed may be determined via an engine position sensor. In one example, method 400 adjusts a speed of the electric turbocharger to a predetermined speed that is empirically determined and stored in a table or function in controller memory. The table or function may be referenced or indexed via engine speed and driver demand torque. Values in the table may be determined via measuring engine efficiency, including electric turbocharger efficiency, while adjusting electric turbocharger speed. The speed of the electric turbocharger may be adjusted via supplying electric charge to the electric turbocharger, reducing charge supplied to the electric turbocharger, or via adjusting a position of the wastegate. The method of adjusting electric turbocharger speed may depend on engine operating conditions. Method 400 adjusts electric turbocharger speed and proceeds to exit.

At 406, method 400 judges if an engine start is requested. An engine start may be requested via a human driver pushing a button, rotating a key switch, or via a request input to another human/machine interface. Alternatively, the engine start request may be made via a controller in response to vehicle operating conditions. A value of a variable in memory may indicate if an engine start is requested. If method 400 judges that an engine start request has been issued, the answer is yes and method 400 proceeds to 408. Otherwise, the answer is no and method 400 proceeds to exit.

At 408, method 400 requests activation of and activates the vehicle system power supply (e.g., a 48 VDC power system). Further, method 400 requests that the power contactor (e.g., 235 of FIG. 1) is closed when the vehicle system power supply is available to supply power to the electric turbocharger. The vehicle system power supply may go through a series of diagnostics and self-tests before it becomes available to supply electric power to the electric turbocharger. It may take from several seconds to tens of seconds before the vehicle system power supply is available to supply electric power to the electric turbocharger and before the power contactor is closed. Method 400 proceeds to 410 after requesting activation of the vehicle system power supply.

At 410, method 400 starts the engine. The engine is started via rotating the engine via an electric machine (e.g., starter motor) and by supplying spark and fuel to the engine. Method 400 proceeds to 412.

At 412, method 400 operates the electric turbocharger in a generator mode. In generator mode, the electric turbocharger's rotor is rotated via exhaust gases. The rotating rotor produces a magnetic field and the magnetic flux from the field induces current flow in the electric turbochargers stator. Output from the electric turbocharger stator is supplied to the inverter as is shown in FIG. 2. The speed of the rotor may be adjusted to regulate output of the electric turbocharger via adjusting a position of a wastegate. Opening the wastegate reduces rotor speed and the output of the electric turbocharger. Closing the wastegate may increase rotor speed and the output of the electric turbocharger. Thus, by adjusting speed of the turbocharger rotor via adjusting wastegate position, a charging rate of the power filter capacitor may be adjusted since the power filter capacitor may be coupled to the electric turbocharger via the three-phase switch array (e.g., transistors 210-215 of FIG. 2). Method 400 proceeds to 414.

At 414, method 400 activates the inverter and begins switching switches in the three-phase switch array (e.g., 210-215 of FIG. 2) to begin charging the power filter capacitor (e.g., 231 of FIG. 2). The switches may be operated via pulse width modulation to convert AC current from the electric turbocharger electric machine into DC current. The DC current then charges the power filter capacitor. In some examples, the power filter capacitor may be charged while no charge is provided to the variable voltage converter capacitors (e.g., 250-252 of FIG. 2). After the power filter capacitor charge reaches a threshold charge, the buck transistor 206 may be activated to supply charge to the converter capacitors. Method 400 proceeds to 416.

At 416, method 400 judges if the power filter capacitor is charged to a threshold level or if the power contactor is closed or an indication is present that the power contactor will close in a predetermined amount of time. Method 400 may monitor power filter capacitor voltage to determine if the power filter capacitor is charged to a threshold amount of charge. The vehicle system power supply may provide the status of the power contactor to the controller. If method 400 judges that the power filter capacitor is charged to a threshold level or if the power contactor is closed, or alternatively, if an indication is present that the power contactor will close in a predetermined amount of time, the answer is yes and method 400 proceeds to 418. Otherwise, the answer is no and method 400 returns to 408.

At 418, method 400 operates the electric turbocharger in a motor mode. However, before the electric turbocharger is operated in a motor mode, the vehicle system power supply charges the power capacitor to a threshold level of charge, if the power capacitor is not charged to the threshold level of charge.

In the motor mode, DC power at node 201 of the inverter is switched via the three phase array transistors 210-215 to the three phase armature windings of the electric machine 143 of the electric turbocharger at different times to cause the rotor of the electric machine to rotate and compress air entering the engine. The boost transistor 208 may be activated to supply electric power from the vehicle system power supply to the DC bus 285. The turbocharger and the three phase inverter switches (e.g., 210-215) may be deactivated until there is a positive indication that the power contactor has closed. Method 400 proceeds to 420.

In this way, the electric turbocharger may first operate as a generator or alternator before a power contactor is closed to charge one or more capacitors in an inverter. The capacitors in the inverter may be charged using vehicle system power supply charge after a power contactor is closed to accelerate charging of the capacitors. However, if the capacitors are charged to a threshold level before the power contactor is closed, then the electric turbocharger may operate in a motor mode immediately after the power contactor is closed, thereby avoiding charging the power filter capacitors with vehicle system power supply charge. By at least partially charging the power capacitors, current in rush to the inverter may be reduced to extend system life and reduce stress within the electrical system.

Thus, the method of FIG. 4 provides for an engine operating method, comprising: receiving input to a controller indicative of a request to start an engine; and operating an electric turbocharger in a generator mode and charging a power filter capacitor coupled to a DC bus via the controller in response to the received input. The method further comprises delaying operating the electric turbocharger in a motor mode until a power contactor is closed and a voltage of the power filter capacitor is greater than a threshold voltage. The method includes where operating the electric turbocharger in a generator mode includes switching one or more transistors of an inverter to charge the power filter capacitor. The method further comprises ceasing to switch the one or more transistors of the inverter in response to a voltage of the power filter capacitor exceeding a threshold voltage. The method includes where the electric turbocharger includes a three-phase electric machine (e.g., electric machine 143). The method further comprises starting an engine via the controller in response to the received input. The method further comprises operating the electric turbocharger in a motor mode and supplying compressed air to an internal combustion engine via the electric turbocharger. The method further comprises adjusting a speed of the electric turbocharger in response to a driver demand torque.

The method of FIG. 4 also provides for an engine operating method, comprising: receiving input to a controller; operating an electric turbocharger in a generator mode and charging a power filter capacitor coupled to a DC bus via the controller in response to the received input; and adjusting speed of the electric turbocharger operating in the generator mode via adjusting a position of a wastegate via the controller. The method includes where the speed of the electric turbocharger is adjusted to control current flow from the electric turbocharger to the power filter capacitor. The method includes where the speed is decreased in response to a voltage of the power filter capacitor exceeding a threshold voltage. The method includes where the wastegate is opened to decrease speed of the electric turbocharger in response to a voltage of the power filter capacitor. The method includes where the wastegate is closed to increase speed of the electric turbocharger in response to a voltage of the power filter capacitor. The method further comprises starting an engine in response to the received input, and where the wastegate is closed during engine starting.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
receiving an input to a controller indicative of a request to start an engine; and
operating an electric turbocharger in a generator mode and charging a power filter capacitor coupled to a DC bus via the controller in response to the received input.

2. The method of claim 1, further comprising delaying operating the electric turbocharger in a motor mode until a power contactor is closed and a voltage of the power filter capacitor is greater than a threshold voltage.

3. The method of claim 1, where operating the electric turbocharger in a generator mode includes switching one or more transistors of an inverter to charge the power filter capacitor.

4. The method of claim 3, further comprising ceasing to switch the one or more transistors of the inverter in response to a voltage of the power filter capacitor exceeding a threshold voltage.

5. The method of claim 1, where the electric turbocharger includes a three-phase electric machine.

6. The method of claim 1, further comprising starting the engine via the controller in response to the received input.

7. The method of claim 1, further comprising operating the electric turbocharger in a motor mode and supplying compressed air to the engine via the electric turbocharger.

8. The method of claim 7, further comprising adjusting a speed of the electric turbocharger in response to a driver demand torque.

9. An engine operating method, comprising:
receiving an input to a controller;
operating an electric turbocharger in a generator mode and charging a power filter capacitor coupled to a DC bus via the controller in response to the received input; and
adjusting speed of the electric turbocharger operating in the generator mode via adjusting a position of a wastegate via the controller.

10. The method of claim 9, where the speed of the electric turbocharger is adjusted to control current flow from the electric turbocharger to the power filter capacitor.

11. The method of claim 10, where the speed is decreased in response to a voltage of the power filter capacitor exceeding a threshold voltage.

12. The method of claim 9, where the wastegate is opened to decrease speed of the electric turbocharger in response to a voltage of the power filter capacitor.

13. The method of claim 9, where the wastegate is closed to increase speed of the electric turbocharger in response to a voltage of the power filter capacitor.

14. The method of claim 9, further comprising starting an engine in response to the received input, and where the wastegate is closed during engine starting.

15. A system, comprising:
an engine;
an electric turbocharger coupled to the engine;
an inverter electrically coupled to the electric turbocharger, the inverter including a power filter capacitor coupled to a DC bus;
a power contactor selectively coupling a DC power source to the inverter; and
a controller including executable instructions stored in non-transitory memory to start the engine and operate the electric turbocharger in a generator mode to charge the power filter capacitor before the power contactor is closed.

16. The system of claim 15, where the inverter includes a three-phase transistor array.

17. The system of claim 15, where the inverter includes a buck transistor and a boost transistor.

18. The system of claim 15, further comprising additional instructions to adjust a position of a wastegate to control output of the electric turbocharger when the electric turbocharger is operating in the generator mode.

19. The system of claim 15, further comprising additional instructions to adjust a position of a wastegate to control output of the electric turbocharger when the electric turbocharger is operating in a motor mode.

20. The system of claim 19, further comprising additional instructions to cease operating the electric turbocharger in the generator mode in response to a voltage of the power filter capacitor.

* * * * *